United States Patent
Maresh

(10) Patent No.: US 7,584,258 B2
(45) Date of Patent: Sep. 1, 2009

(54) METHOD AND SYSTEM FOR MANAGING INSTANT MESSAGING STATUS

(75) Inventor: Mark Edmund Maresh, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 683 days.

(21) Appl. No.: 11/294,288

(22) Filed: Dec. 5, 2005

(65) Prior Publication Data

US 2007/0130275 A1 Jun. 7, 2007

(51) Int. Cl.
*G06F 15/16* (2006.01)
*G06F 12/00* (2006.01)

(52) U.S. Cl. ........................ 709/206; 709/207
(58) Field of Classification Search ................ 709/206, 709/207, 203, 226, 250
See application file for complete search history.

(56) References Cited

U.S. PATENT DOCUMENTS

| | | | |
|---|---|---|---|
| 6,640,230 B1 | 10/2003 | Alexander et al. | 707/10 |
| 6,988,128 B1* | 1/2006 | Alexander et al. | 709/206 |
| 2003/0046296 A1* | 3/2003 | Doss et al. | 707/102 |
| 2004/0117443 A1 | 6/2004 | Barsness | 709/204 |
| 2004/0133638 A1 | 7/2004 | Doss et al. | 709/203 |
| 2004/0203659 A1* | 10/2004 | Mikan | 455/414.1 |
| 2005/0071433 A1* | 3/2005 | Shah | 709/207 |
| 2005/0080848 A1 | 4/2005 | Shah | 709/204 |
| 2005/0114777 A1 | 5/2005 | Szeto | 715/710 |
| 2006/0031326 A1* | 2/2006 | Ovenden | 709/206 |
| 2006/0117087 A1* | 6/2006 | Demsky et al. | 709/206 |
| 2006/0190547 A1* | 8/2006 | Bhogal et al. | 709/207 |

* cited by examiner

*Primary Examiner*—Zarni Maung
(74) *Attorney, Agent, or Firm*—Yee & Associates, P.C.; Steven L. Bennett

(57) ABSTRACT

A system for managing instant messaging status. An occurrence of an event for a user in a calendar application is detected. A status of the user for an instant messaging system is controlled during the occurrence of the event in response to detecting the occurrence of the event.

20 Claims, 10 Drawing Sheets

METHOD AND SYSTEM FOR MANAGING INSTANT MESSAGING STATUS

BACKGROUND OF THE INVENTION

1. Field of the Invention

The present invention relates generally to an improved data processing system. More specifically, the present invention is directed to a computer implemented method, apparatus, and computer usable program code for managing instant messaging status.

2. Description of the Related Art

There is no doubt that the Internet has changed the way people and businesses communicate. Instant messaging (IM) is a type of computer application that is designed to facilitate communication among multiple computer users attached to a network, such as, for example, the Internet.

Instant messaging may be implemented in various ways, but in general it supports the sending and receiving of instant messages to and from other users. Instant messages are correspondence that appears on a computer display of a recipient more or less instantaneously after being sent. This is opposed to the more traditional e-mail messages, which typically are logged in a system until a recipient wishes to view them. The ability to receive correspondence instantly gives instant messaging a more spontaneous, conversational quality to it than does traditional e-mail. Thus, instant messaging provides an alternative form of communication using computers attached to a network. Instant message applications may be used by a variety of users, such as, groups of individuals working closely together on some critical project or more casual users at home wanting to see if someone is available to receive a message immediately.

Instant messaging systems allow a person or business to maintain a list of people that they desire to interact with online. The person or business may send messages to any of the individuals contained on the list, often called a buddy list or contact list, as long as the individual is online at the time the message is sent. Sending an instant message opens up a small window display on each computer interface so that both individuals involved with in the process may type in and read messages.

Normally, instant messaging involves two people online, sending notes back and forth to each other. Additionally, instant messaging systems may enable users to send alerts to one another. An instant messaging alert may be used to convey information when no response is desired, such as, for example, a meeting reminder. A "chat room" is a software program that allows a group of people to communicate with each other by allowing each member of the group to type in messages that are seen by everyone in the chat room. An instant messaging system generally comprises a plurality of instant messaging client devices coupled to an instant messaging server via a data processing system network. Messages and connection information is maintained on the server that is controlled by a provider of the instant messaging service. Examples of instant messaging services are Lotus® Sametime®, Microsoft® Network (MSN®) Messenger, Sun™ONE Instant Messenger, AOL® Instant Messenger (AIM®), and Yahoo! Messenger™.

Today, most computers are connected to some type of network. A network allows a computer to share information with other computer systems. The Internet is only one example of a computer network. Many commercial business environments connect computers via a local area network (LAN) or by another means. A LAN may be utilized by a business enterprise to connect its computers for the purpose of allowing co-workers to instantaneously communicate with each other. In most business environments, instantaneous communication between employees is essential to increased productivity. However, this ability of allowing co-workers to instantaneously communicate with each other may also detrimentally impact the ability of co-workers to be productive because of constant interruptions by instant messages, especially during scheduled events, such as meetings or appointments.

Therefore, it would be beneficial to have a computer implemented method, apparatus, and computer usable program code for managing instant messaging status during scheduled events.

BRIEF SUMMARY OF THE INVENTION

Embodiments of the present invention provide a computer implemented method, apparatus, and computer usable program code for managing instant messaging status. An occurrence of an event for a user in a calendar application is detected and in response to detecting the occurrence of the event, a status of the user for an instant messaging system is controlled during the occurrence of the event.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
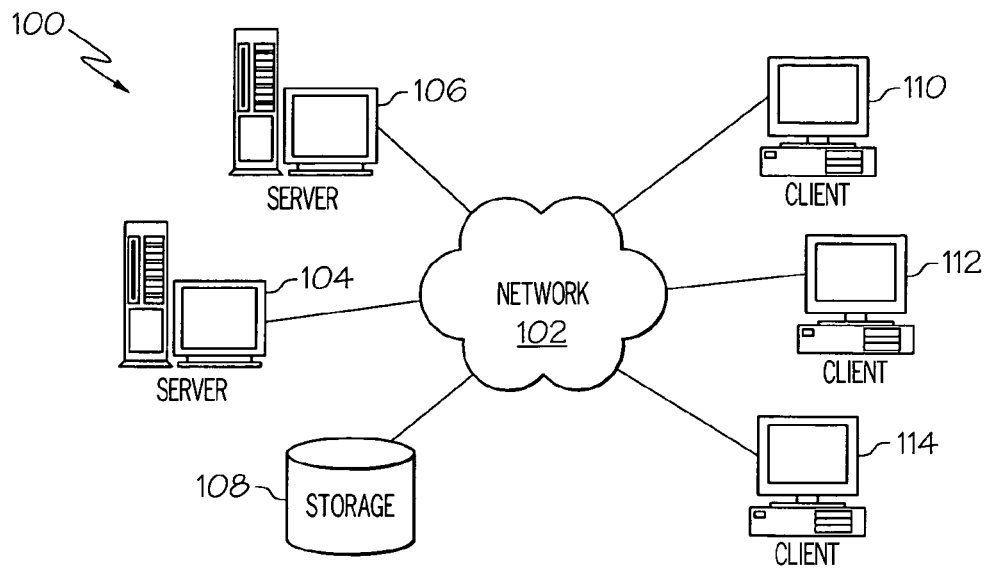
FIG. 1 is a pictorial representation of a network of data processing systems in which aspects of the present invention may be implemented.
Figure 2:
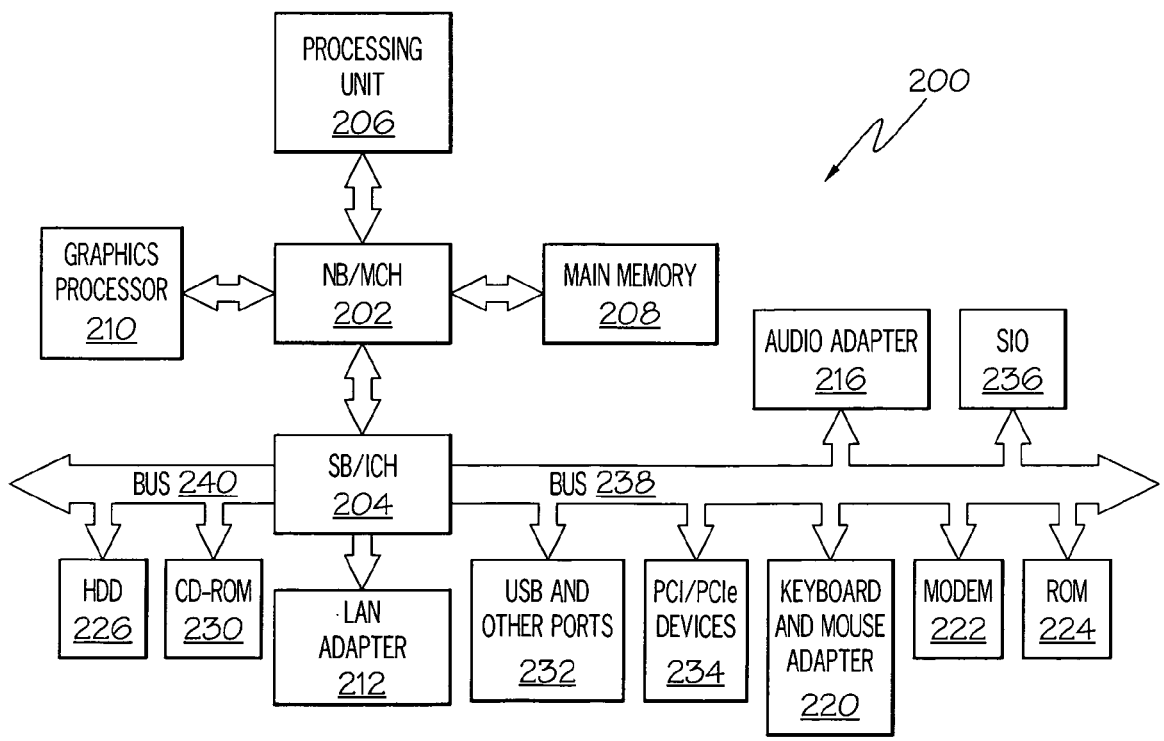
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pseries® computer system, running the Advanced Interactive Executive (AIX®) operating system or the LINUX® operating system (eserver, pseries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a computer implemented method, apparatus, and computer usable program code for managing instant messaging status. A calendar application detects an occurrence of an event for a user within the calendar application. The event may be, for example, a scheduled calendar appointment or meeting. In response to detecting the occurrence of the event, the calendar application controls a status of the user for an instant messaging system during the occurrence of the event. The instant messaging status for the user may be, for example, do not disturb or I am in a meeting.

The calendar application changes the instant messaging status of the user if the status is different from a preferred status specified for the event. However, either the calendar application or the instant messaging system may control the instant messaging status for the user during the scheduled calendar event. The calendar application and the instant messaging application may be linked together during the occurrence of the event in order for the calendar application to control the instant messaging status for the user. The user links the calendar application with the instant messaging application by setting preferences and inputting the address of the linked application in each of the applications' preference windows.

A benefit of embodiments of the present invention may be that productivity of a user may be increased. Productivity of the user may be increased because the user receives fewer interruptions during important scheduled calendar events when the instant messaging status is automatically controlled by the calendar application, which records the date and time for each user scheduled event. Another benefit of embodiments of the present invention may be that the user has more flexibility in managing instant messaging interruptions. This increased flexibility is accomplished by the user setting calendar application preferences from within the calendar application to control how many interruptions the user is willing to accept during a scheduled calendar event without constantly updating the instant messaging status settings in the instant messaging application.

Figure 3:
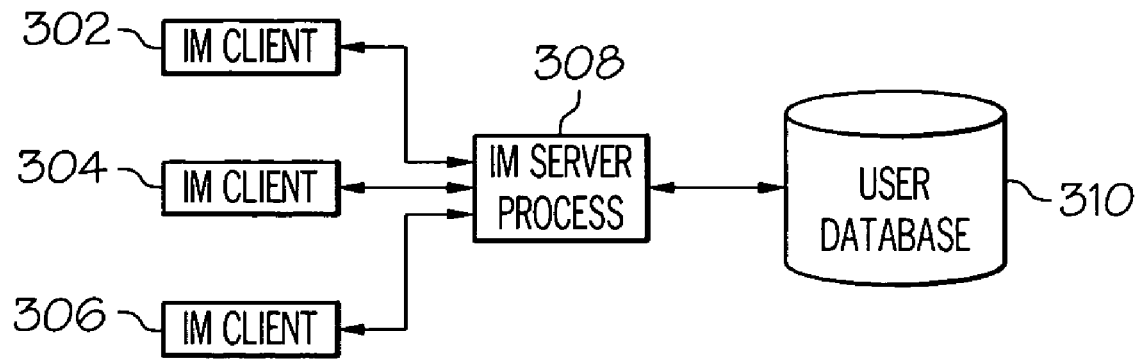
FIG. 3 is an exemplary block diagram illustrating components used in managing instant messages in accordance with an embodiment of the present invention.

Referring now to FIG. 3, an exemplary block diagram illustrating components used in managing instant messages is depicted in accordance with an embodiment of the present invention. In this illustrative example, a user utilizing instant messaging client 302 may send or exchange messages over a network with other users using instant messaging clients 304 and 306. For example, client 110 may exchange messages over network 102 with client 112 and client 114 in FIG. 1. The exchanging of messages may be, for example, via instant messaging, broadcast messaging, or any other synchronous messaging system that may be utilized by embodiments of the present invention.

Broadcast messaging provides a means for sending a single message instantaneously to all members of a predefined community of instant messaging clients. Broadcast messaging may be utilized within the predefined community to, for example, conduct instant chat rooms, broadcast instant alert messages, hold instant web presentations, and poll individuals within the predefined community for instant feedback. The predefined community may be, for example, employees of an enterprise, members of an organization, students, teachers, and support staff of an educational institution, governmental entities, and individuals, all of whom may comprise a contact or buddy list individually or in combination.

Instant messaging clients 302, 304, and 306 may be executing on a data processing system, such as, for example, data processing system 200 in FIG. 2. It should be noted that even though the exemplary illustration of FIG. 3 depicts three instant messaging clients, embodiments of the present invention are not restricted to such. For example, an entity using the processes of an embodiment of the present invention may employ fewer or more instant messaging clients as is necessary to complete the mission of the entity.

The exchange of messages in these examples is facilitated through instant messaging server process 308. Instant messaging server process 308 may be located on a server, such as data processing system 200 in FIG. 2. Instant messaging server process 308 allows users to find other users within the instant messaging system, as well as, aid in the exchange of messages between the different users. Depending on the particular instant messaging system, instant messaging server process 308 may only be involved in providing an indication of when particular users are online and for establishing initial contacts while users contacting users already on a buddy list may contact those users directly after seeing that a particular user is online.

In these examples, the different users registered to the instant messaging system are stored in user database 310. User database 310 provides information needed to search for and find other users, as well as, contact users when they are online.

Figure 4:
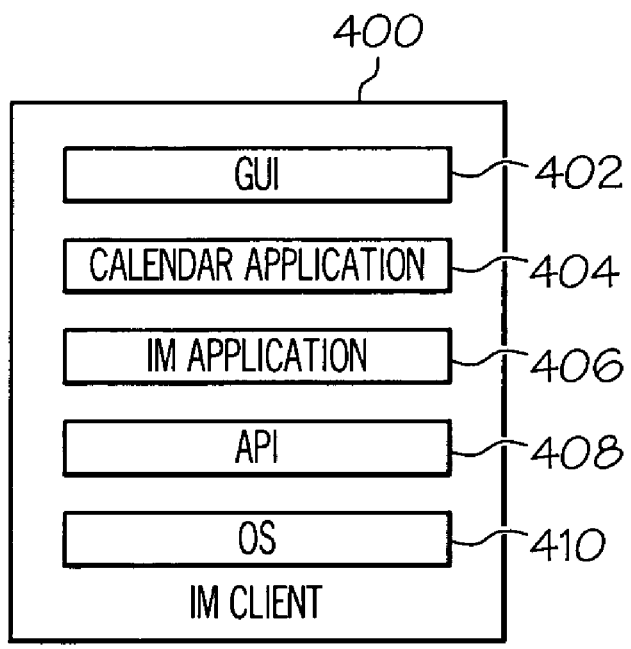
FIG. 4 is an exemplary block diagram illustrating components of an instant messaging client device in accordance with an embodiment of the present invention.

Turning now to FIG. 4, an exemplary block diagram illustrating components of an instant messaging client device is shown in accordance with an embodiment of the present invention. Instant messaging client 400 may be, for example, instant messaging client 302 in FIG. 3. Instant messaging client 400 may include, for example, graphical user interface (GUI) 402, calendar application 404, instant messaging application 406, application programming interface (API) 408, and operating system (OS) 410.

A user of instant messaging client 400 utilizes graphical user interface 402 to interact with the applications residing in instant messaging client 400, such as calendar application 404 and instant messaging application 406. A graphical user interface is a graphics-based user interface that incorporates movable windows, icons, and a mouse. Graphical user interfaces have become the standard way users interact with computers.

The user may employ calendar application 404 to schedule events. A scheduled calendar event may be, for example, a scheduled appointment, a business meeting, a business trip, vacation, and the like. Embodiments of the present invention may utilize any calendar application that is capable of being linked to an instant messaging application, such as instant messaging application 406.

The user may use instant messaging application 406 to connect to and access an instant messaging server over a network. For example, instant messaging client 302 utilizes an instant messaging application to access instant messaging server process 308 in FIG. 3. Instant messaging application 406 may be any instant messaging application that may be utilized by embodiments of the present invention.

Application programming interface 408 allows the user of instant messaging client 400, an individual, or a software routine, to invoke system capabilities using a standard consistent interface without concern for how the particular functionality is implemented.

Calendar application 404 and instant messaging application 406 may run, for example, on operating system 410. Calendar application 404 and instant messaging application 406 represents any number of software applications designed to react to data to provide the desired functionality the user seeks. The software applications represented by calendar application 404 and instant messaging application 406 may include those software applications necessary to handle data, video, graphics, photos, or text. Embodiments of the present invention may be implemented within calendar application 404 and instant messaging application 406 in these examples.

Operating system 410 is utilized to provide high-level functionality to the user and to other software. Such an operating system typically includes a basic input output system. Operating system 410, calendar application 404, and instant messaging application 406 may employ user input devices in order to obtain input from the user. User input devices may include a pointing device, such as a mouse, and a keyboard, or any other input device known to those of ordinary skill in the art. User input devices may be used, for example, to set user preferences in a preference window displayed on graphical user interface 402. However, embodiments of the present invention are not restricted to utilizing user input devices for the sole purpose of setting user preferences. The user input devices may be used for any purpose necessary to accomplish the processes of embodiments of the present invention.

A processor, such as, for example, processor 206 in FIG. 2, performs the basic operations in instant messaging client 400. The processor may, for example, display information on graphical user interface 402. Graphical user interface 402 has a plurality of picture elements, collectively referred to as a screen, which may define the appearance of a user interface environment displayed on graphical user interface 402. Graphical user interface 402 screen contents and, therefore, the appearance of the user interface environment, may be controlled or altered by calendar application 404, instant messaging application 406, or operating system 410 either individually or in combination.

Figure 5:
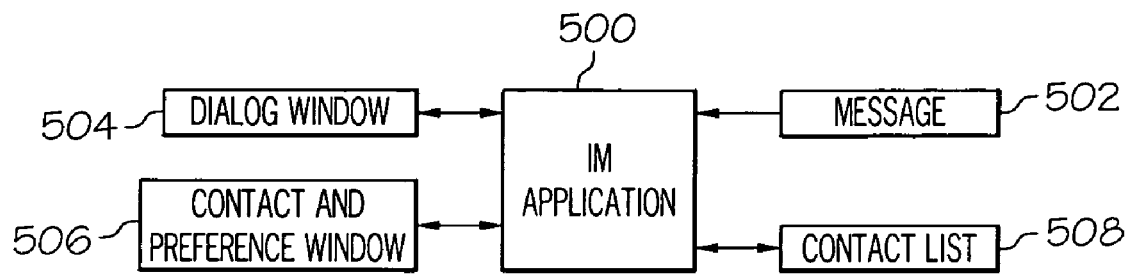
FIG. 5 is an exemplary block diagram illustrating an instant messaging application in accordance with an embodiment of the present invention.

With reference now to FIG. 5, an exemplary block diagram illustrating an instant messaging application is depicted in accordance with an embodiment of the present invention. The components shown in FIG. 5 may be found in an instant messaging application, such as instant messaging application 406 in FIG. 4. These components may be implemented in a data processing system, such as, for example, data processing system 200 in FIG. 2.

Instant messaging application 500 may, for example, process messages, such as message 502. As instant messaging application 500 receives messages, these received messages are presented in dialog window 504. Additionally, dialog window 504 provides an interface for a user to input text in order to draft and send messages to other users.

Instant messaging application 500 presents contact and preference window 506 to provide the user with a contact list of user names, as well as other information. Contact and preference window 506 also provides an interface to allow the user to set different preferences. For example, the user may set passwords required to access different names used in instant messaging sessions. Additionally, the user may set a preference to link the instant messaging application to another application within the data processing system, such as a calendar application. For example, a user may set a preference in instant messaging application 406 to link instant messaging application 406 with calendar application 404 within instant messaging client 400 in FIG. 4.

Further, the user may use contact and preference window 506 to set other preferences, such as alerts, colors, and fonts used in instant messaging application 500. These preferences also may include whether a picture is to be sent when an instant messaging session is initiated with another user. Depending on the implementation, the preference may be set to allow a user who receives messages to retrieve images of the senders from a remote database, such as user database 310 in FIG. 3, or a local cache.

In addition, contact and preference window 506 stores in contact list 508 a list of names presented by contact and preference window 506 in these examples. The user may edit contact list 508 by adding to or delete from contact list 508 other users. Contact list 508 is utilized for presenting the list of names within contact and preference window 506.

Figure 6:
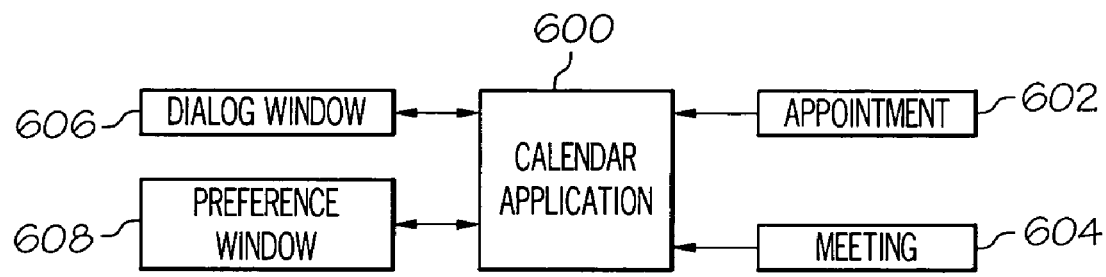
FIG. 6 is an exemplary block diagram illustrating a calendar application in accordance with an embodiment of the present invention.

Referring now to FIG. 6, an exemplary block diagram illustrating a calendar application is depicted in accordance with an embodiment of the present invention. The components shown in FIG. 6 may be located in a calendar application, such as calendar application 404 in FIG. 4. These components may be implemented in a data processing system, such as, for example, data processing system 200 in FIG. 2.

Calendar application 600 may, for example, process appointment and meeting times for a user, such as appointment 602 and meeting 604. Calendar application 600 uses display window 606 to receive appointment 602 and meeting 604. In addition, display window 606 provides an interface for the user to input text with regard to appointment 602 and meeting 604, such as, for example, names of people involved, subject matter, description of the event, importance of the event, et cetera.

Calendar application 600 presents preference window 608 to provide the user with an interface to allow the user to set a variety of preferences. For example, the user may set a password to protect calendar application 600 from unwanted intrusion by other users. Moreover, the user may set a preference to link the calendar application to another application within the data processing system, such as an instant messaging application. For example, a user may set a preference in calendar application 404 to link calendar application 404 with instant messaging application 406 within instant messaging client 400 in FIG. 4. Furthermore, the user may use preference window 608 to set other preferences, such as event alerts, and "Do Not Disturb" and "I am unavailable" messages used by calendar application 600.

Figure 7:
FIG. 7 is an exemplary illustration of a display window for a calendar application in accordance with an embodiment of the present invention.

Turning now to FIG. 7, an exemplary illustration of a display window for a calendar application is shown in accordance with an embodiment of the present invention. Calendar application display window 700 may be, for example, display window 606 for calendar application 600 in FIG. 6. A user may utilize calendar application display window 700 to input a scheduled event into the calendar application or to edit previously inputted information concerning a scheduled event.

Calendar application display window 700 may include, for example, event type 702, event subject 704, event date and time 706, and event description 708. Event type 702 may be, for example, a drop-down menu, which may include event types, such as appointment, meeting, teleconference, vacation, and the like. Of course, embodiments of the present invention are not limited to the above list of event types. Any event type that may utilize processes of embodiments of the present invention may be used. A user may utilize event type 702 to classify the type of each scheduled calendar event.

The user may use event subject 704 as a title or subject line for the scheduled event. Event date and time 706 is used to input the date and the time of the scheduled event. In this illustrative example, the scheduled calendar event, which is an appointment, occurs on Wednesday, Oct. 26, 2005, from 1:00 p.m. until 2:00 p.m. The user may use event description 708 to describe the scheduled calendar event and to attach any relevant information.

In addition, calendar application display window 700 also may include, for example, instant messaging status check box 710, instant messaging status dialog box 712, and do not disturb check box 714. A check box is a small box on screen that simulates the equivalent symbol on a paper form. Options in software applications are often selected with a check box. Clicking on the check box with a mouse switches the check box to its opposite state. When a check box contains a checkmark, such as instant messaging status check box 710 in this illustrative example, the option is "enabled." Enabled means that the option is turned on and active. When the check box is empty, the option is not active or "disabled."

When a user opens a scheduled calendar event on the calendar application, calendar application display window 700 appears in the graphical user interface, such as graphical user interface 402 in FIG. 4, with instant messaging status check box 710 visible. A checkmark in instant messaging status check box 710 means that the calendar application is in control of the instant messaging status for a linked instant messaging application during the scheduled calendar event. Conversely, if instant messaging status check box 710 does not contain a checkmark, then the instant messaging status control remains with the instant messaging application. It should be noted that if there are no scheduled calendar events, then the instant messaging application controls the instant messaging status. In this illustrative example, because instant messaging status check box 710 contains a checkmark, the calendar application controls the instant messaging status for the linked instant messaging application for the scheduled event on Wednesday, Oct. 26, 2005, from 1:00 p.m. until 2:00 p.m.

Instant messaging status dialog box 712 may, for example, automatically display a default message with regard to the instant messaging application status when instant messaging status check box 710 contains a checkmark. In the illustrative example depicted in FIG. 7, instant messaging status dialog box 712 displays the default message "I am at an appointment." Consequently, for this illustrative example, the instant messaging status for the user is "I am at an appointment" during the scheduled calendar event. Alternatively, the user may input, by keyboard for example, any desired message in instant messaging status dialog box 712 with regard to the instant messaging status. Also, the user may change the message in instant messaging status dialog box 712 at any time during the scheduled calendar event, thus, updating the instant messaging status as the user desires instantaneously.

Do not disturb check box 714 may be used to indicate that the user does not want to be disturbed during the scheduled calendar event. In this particular example, do not disturb check box 714 contains a checkmark, which means that the do not disturb option is enabled for the scheduled calendar event. Further, do not disturb check box 714 may take precedence over or override the message shown in instant messaging status dialog box 712. In other words, if do not disturb check box 714 contains a checkmark, then the instant messaging status is do not disturb irrespective of the message contained in instant messaging status dialog box 712.

Calendar application display window 700 also may contain save and close button 716. The user may employ save and close button 716 to save the information inputted into calendar application display window 700 when finished and then to close calendar application display window 700.

Figure 8:
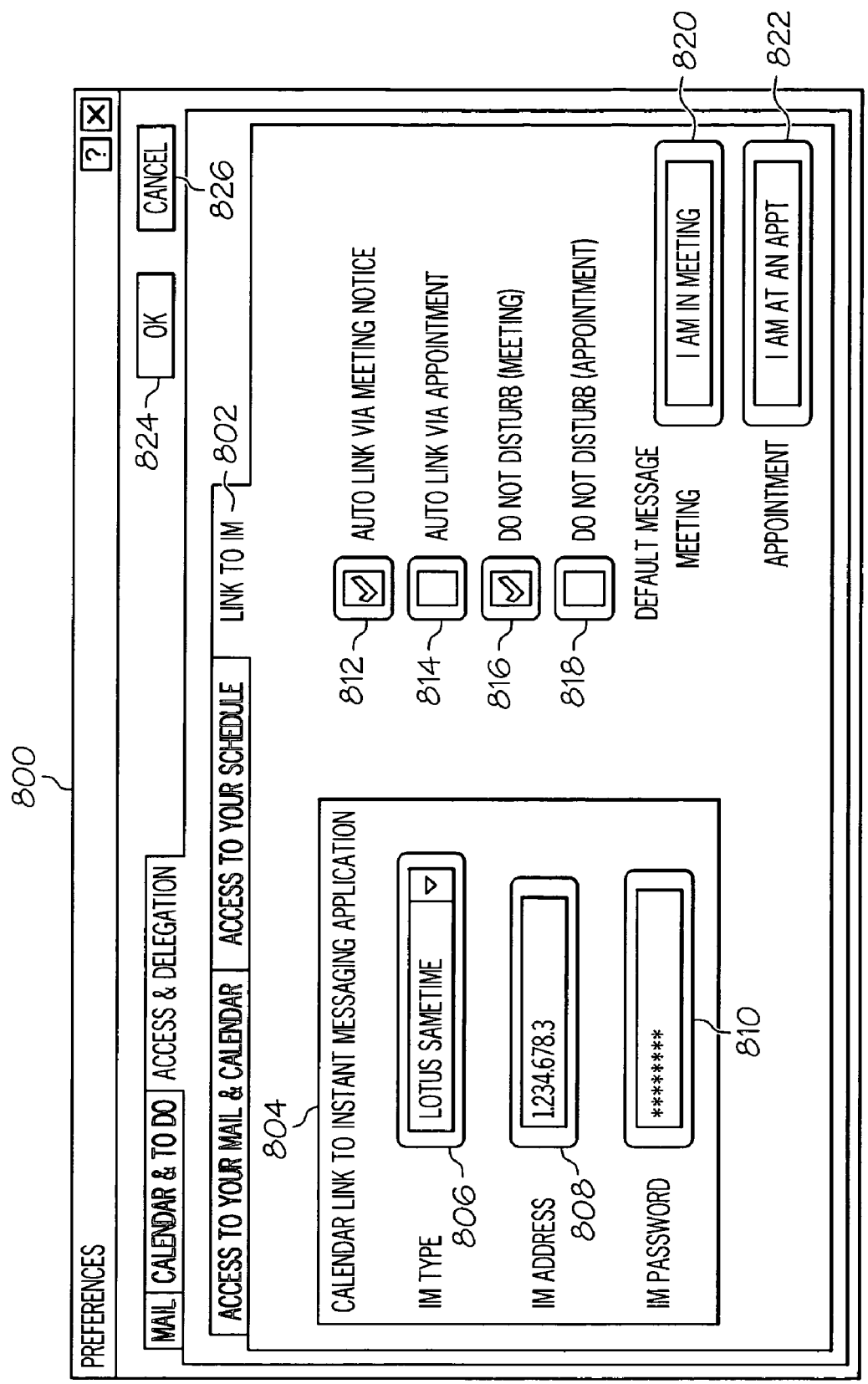
FIG. 8 is an exemplary illustration of a preference window for a calendar application in accordance with an embodiment of the present invention.

With reference now to FIG. 8, an exemplary illustration of a preference window for a calendar application is shown in accordance with an embodiment of the present invention. Calendar application preference window 800 may be, for example, preference window 608 for calendar application 600 in FIG. 6. A user may utilize calendar application preference window 800 to input user preferences with regard to the calendar application.

Calendar application preference window 800 may include, for example, link to instant messaging tab 802. A user clicks on instant messaging tab 802, with a mouse for example, to access preferences and options for linking the calendar application, such as calendar application 404 in FIG. 4, to an instant messaging application, such as instant messaging application 406 in FIG. 4, within the data processing system, such as instant messaging client 400 in FIG. 4. Link to instant messaging tab 802 may contain, for example, calendar link to instant messaging application 804. Calendar link to instant messaging application 804 provides the information necessary for the calendar application to link to and communicate with the instant messaging application.

Calendar link to instant messaging application 804 may include, for example, instant messaging application type 806, instant messaging application address 808, and instant messaging password 810. However, embodiments of the present invention are not restricted to the above listed information for linking the calendar application with the instant messaging application. Those of ordinary skill in the art should appreciate that any information necessary for embodiments of the present invention to link the calendar application to the instant messaging application may be utilized.

Instant messaging application type 806 may be, for example, a drop-down menu containing a list of instant messaging application names utilized by the user on the data processing system. The instant messaging application type is important information because there may be unique requirements for the link that are directly tied to the instant messaging application. The user selects instant messaging application type 806 by selecting from the list of instant messaging application names included in the drop-down menu the name of the instant messaging application that the user desires to link with the calendar application.

Subsequent to selecting instant messaging type 806, the calendar application automatically inserts instant messaging application address 808. Alternatively, the user may input instant messaging application address 808. Instant messaging application address 808 specifically identifies the selected instant messaging application in instant messaging application type 806. Instant messaging application address 808 is needed to create the link between the calendar application and the instant messaging application.

Instant messaging password 810 is required in order to access the instant messaging application if the instant messaging application is password protected. The user inputs the instant messaging application password in the dialog box of instant messaging password 810.

Link to instant messaging tab 802 also may include preferences, such as, for example, auto link via meeting notice check box 812, auto link via appointment notice check box 814, do not disturb meeting check box 816, and do not disturb appointment check box 818. If auto link via meeting notice check box 812 contains a checkmark, which it does in the illustrative example depicted in FIG. 8, then the instant messaging status check box on the calendar application display window will automatically contain a checkmark for any scheduled calendar events that are created via a meeting notice. For example, instant messaging status check box 710 of FIG. 7 will automatically contain a checkmark if auto link via meeting notice check box 812 contains a checkmark and the scheduled calendar event is a meeting. Thus, for this illustrative example, the calendar application will automatically link to the instant messaging application for scheduled calendar meetings.

Similarly, if auto link via appointment notice check box 814 contains a checkmark, then the instant messaging status check box on the calendar application display window will automatically contain a checkmark for any scheduled calendar events that are created via an appointment notice. However, in the illustrative example depicted in FIG. 8, auto link via appointment notice check box 814 does not contain a checkmark. Consequently, the instant messaging status check box on the calendar application display window will not automatically contain a checkmark for any scheduled calendar events that are created via an appointment notice. Therefore, for this illustrative example, the calendar application will not automatically link to the instant messaging application for scheduled calendar appointments.

If do not disturb meeting check box 816 contains a checkmark, which it does in the illustrative example depicted in FIG. 8, then the do not disturb check box on the calendar application display window will automatically contain a checkmark for any scheduled meeting calendar events. For example, do not disturb check box 714 of FIG. 7 will automatically contain a checkmark if do not disturb meeting check box 816 contains a checkmark and the scheduled calendar event is a meeting. Hence, for this illustrative example, the calendar application display window will automatically contain a checkmark in the do not disturb checkbox, which will automatically set the instant messaging status for the user as do not disturb during scheduled meetings.

Similarly, if do not disturb appointment check box 818 contains a checkmark, then the do not disturb check box on the calendar application display window will automatically contain a checkmark for any scheduled appointments. However, in the illustrative example depicted in FIG. 8, do not disturb appointment check box 818 does not contain a checkmark. Consequently, the do not disturb check box within the calendar application display window will not automatically contain a checkmark for any scheduled appointment calendar events. Therefore, for this illustrative example, the calendar application will not automatically set the instant messaging status as do not disturb for scheduled appointments.

Further, link to instant messaging tab 802 also may include default instant messaging status messages, such as, for example, default meeting message 820 and default appointment message 822. The user may input any desired text within the dialog boxes for default meeting message 820 and default appointment message 822. Default meeting message 820 is automatically displayed in the instant messaging status dialog box within the calendar application display window for scheduled meetings. For example, if the scheduled calendar event is a meeting, then default meeting message 820 "I am in a meeting" will automatically appear in instant messaging status dialog box 712 in FIG. 7.

Likewise, the calendar application will automatically display default appointment message 822 in the instant messaging status dialog box within the calendar application display window for scheduled appointments. In other words, if the scheduled calendar event is an appointment, then default appointment message 822 "I am at an appointment" will automatically appear in the instant messaging status dialog box within the calendar application display window. However, as discussed in the description of FIG. 7 above, the user may manually change the instant messaging status dialog box message within the calendar application display window at any time.

Furthermore, calendar application preference window 800 also may include buttons to save or cancel input preference settings contained within link to instant messaging tab 802, such as, for example, OK button 824 and Cancel button 826. The user may click on OK button 824 after entering the user's preferences in order to save the preference settings for the calendar application. Conversely, the user may click on Cancel button 826 for the purpose of canceling the preference settings input by the user.

Figure 9:
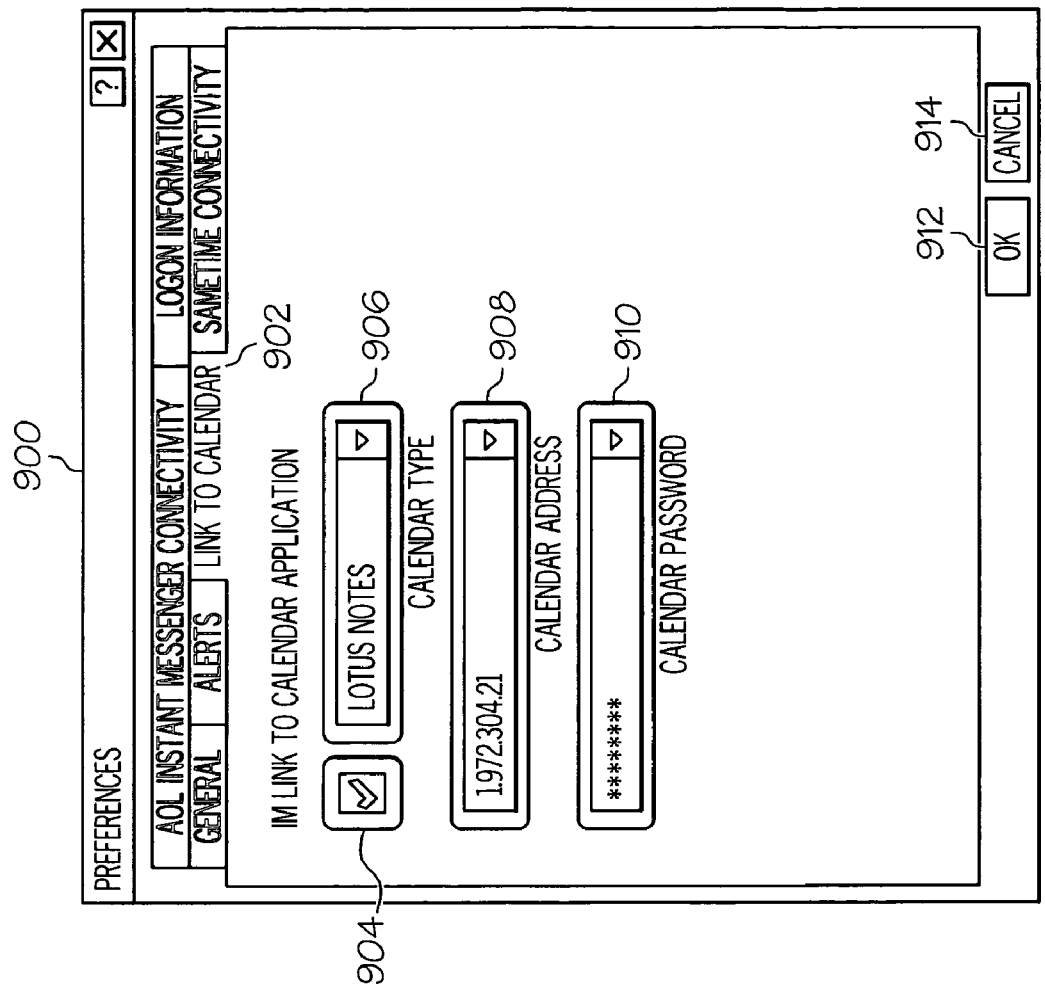
FIG. 9 is an exemplary illustration of a preference window for an instant messaging application in accordance with an embodiment of the present invention.

Referring now to FIG. 9, an exemplary illustration of a preference window for an instant messaging application is depicted in accordance with an embodiment of the present invention. Instant messaging application preference window 900 may be, for example, contact and preference window 560 for instant messaging 500 in FIG. 5. A user may use instant messaging application preference window 900 to enter user preferences regarding the instant messaging application.

Instant messaging application preference window 900 may include, for example, link to calendar tab 902. A user may employ, for example, a mouse to click on link to calendar tab 902 within instant messaging application preference window 900 to access user preferences for linking the instant messaging application to the calendar application. For example, a user may utilize instant messaging application preference window 900 in order to link instant messaging application 406 to calendar application 404 within instant messaging client 400 in FIG. 4.

Link to calendar tab 902 may contain, for example, instant messaging link to calendar application check box 904. A user uses instant messaging link to calendar application check box 904 to indicate the user's preference to link the instant messaging application to the calendar application. If calendar application check box 904 contains a checkmark, which it does in the illustrative example of FIG. 9, then the link is created to the calendar application. The instant messaging application by creating the link to the calendar application allows the calendar application to control the instant messaging status during scheduled calendar events. For example, because calendar application check box 904 contains a checkmark, the calendar application controls the instant messaging status for the instant messaging application during a scheduled calendar event, such as appointment event type 702 that occurs on event date and time 706 Wednesday, Oct. 26, 2005, from 1:00 p.m. until 2:00 p.m. in FIG. 7. If calendar application check box 904 does not contain a checkmark, then the instant messaging application controls the instant messaging status for the user even during scheduled calendar events.

Link to calendar tab 902 also may contain, for example, calendar application type 906, calendar application address 908, and calendar password 910. Calendar application type 906, calendar application address 908, and calendar password 910 provide the information necessary for the instant messaging application to link to and communicate with the calendar application. However, embodiments of the present invention are not restricted to the information list above for establishing a link between the instant messaging application and the calendar application. Those of ordinary skill in the art should appreciate that any information necessary for embodiments of the present invention to link the instant messaging application to the calendar application may be used.

Calendar application type 906 may be presented as, for example, a drop-down menu containing a list of calendar applications contained within the data processing system. Calendar application type information is important because unique requirements for the linking process may be directly tied to the calendar application. The user selects calendar application type 906 by selecting a calendar application within the drop-down menu that the user desires to link with the instant messaging application.

After selecting calendar application type 906, calendar application address 908 automatically appears. Alternatively, the user may input calendar application address 908 by using, for example, a keyboard. Calendar application address 908 specifically identifies the selected calendar application in calendar application type 906. Calendar application address 908 is required to create the link between the instant messaging application and the calendar application.

Calendar password 910 is needed to open the calendar application if the calendar application is password protected by the user. The user inputs the password into calendar password 910.

In addition, instant messaging application preference window 900 also may include buttons to save or cancel user inputted preference settings contained within link to calendar tab 902, such as, for example, OK button 912 and cancel button 914. The user mouse clicks on OK button 912 to save the preference settings for the instant messaging application after the user enters the preferences. Or, the user may mouse click on cancel button 914 to cancel the user inputted preference settings.

Figure 10:
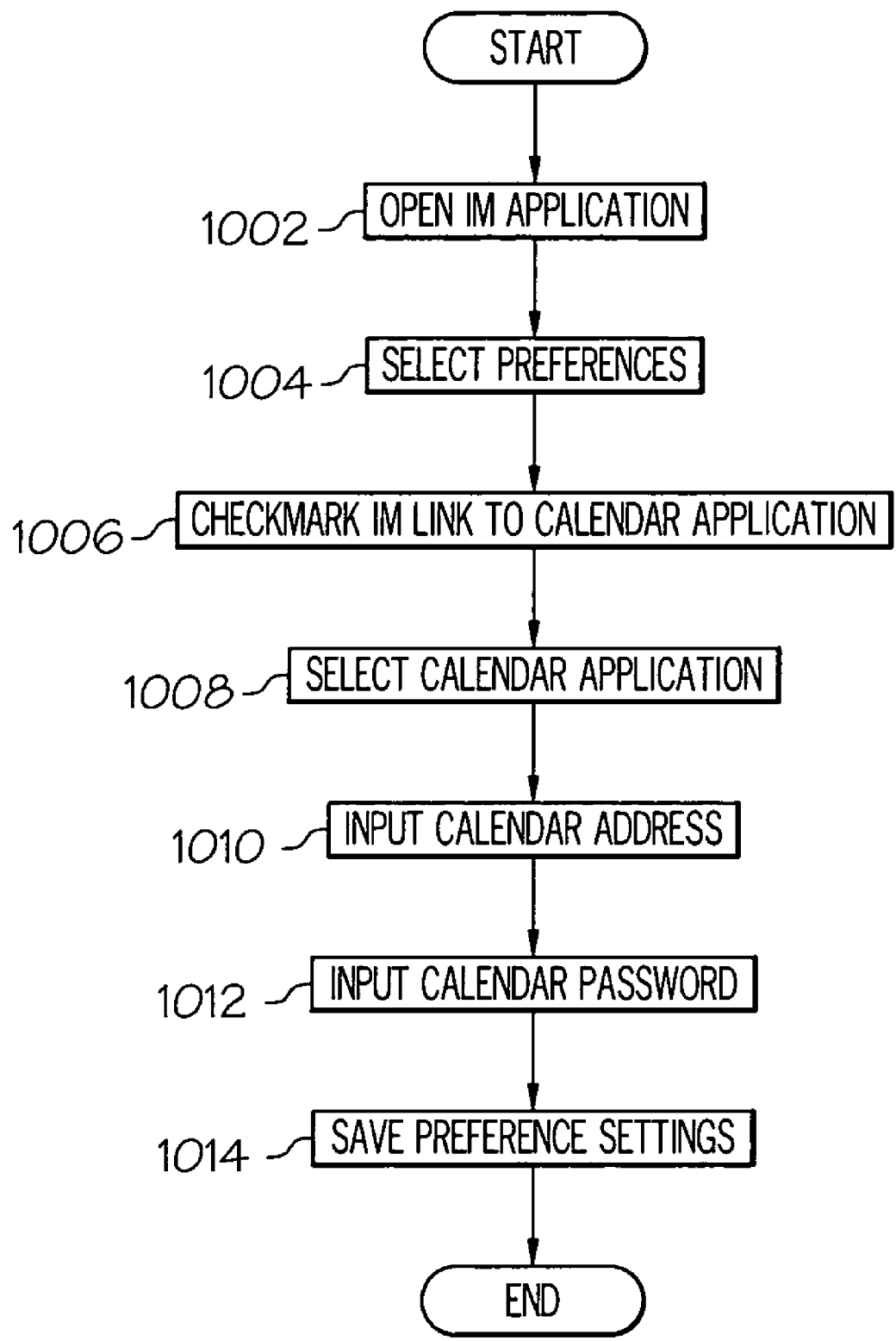
FIG. 10 is a flowchart illustrating an exemplary process for setting instant messaging preferences for linking an instant messaging application in accordance with an embodiment of the present invention.

Turning now to FIG. 10, a flowchart illustrating an exemplary process for setting instant messaging preferences for linking an instant messaging application to a calendar application is depicted in accordance with an embodiment of the present invention. The process depicted in FIG. 10 may be implemented, for example, in a client device, such as instant messaging client 400 in FIG. 4.

The process begins when a user opens an instant messaging application, such as instant messaging application 406 in FIG. 4 (step 1002). The user then selects preferences, for example, in a menu bar, to access an instant messaging application preference window for the opened instant messaging application in step 1002, such as instant messaging application preference window 900 in FIG. 9 (step 1004). The user checkmarks the instant messaging link to calendar application check box, such as instant messaging link to calendar application check box 904 in FIG. 9, to indicate the user's preference to link the instant messaging application to the calendar application (step 1006).

Subsequent to indicating the user's preference to link the instant messaging application to the calendar application in step 1006, the user selects the calendar application that the user desires to link to the instant messaging application from a drop-down menu, such as calendar type 906 in FIG. 9 (step 1008). Then the user inputs the address of the selected calendar application in step 1008 within a calendar address dialog box, such as calendar address 908 in FIG. 9 (step 1010). Alternatively, the instant messaging application may automatically insert the calendar address of the selected calendar application in step 1008 into the calendar address dialog box. The instant messaging application needs the calendar address in order to link the instant messaging application with the calendar application.

If the calendar application is password protected, the user inputs the calendar application password into a calendar password dialog box, such as calendar password 910 in FIG. 9 (step 1012). The user saves the inputted preference settings within the instant messaging preference window by, for example, mouse clicking on a save button, such as OK button 912 in FIG. 9, thereby, enabling the instant messaging application to link to the calendar application (step 1014). The process terminates thereafter.

Figure 11:
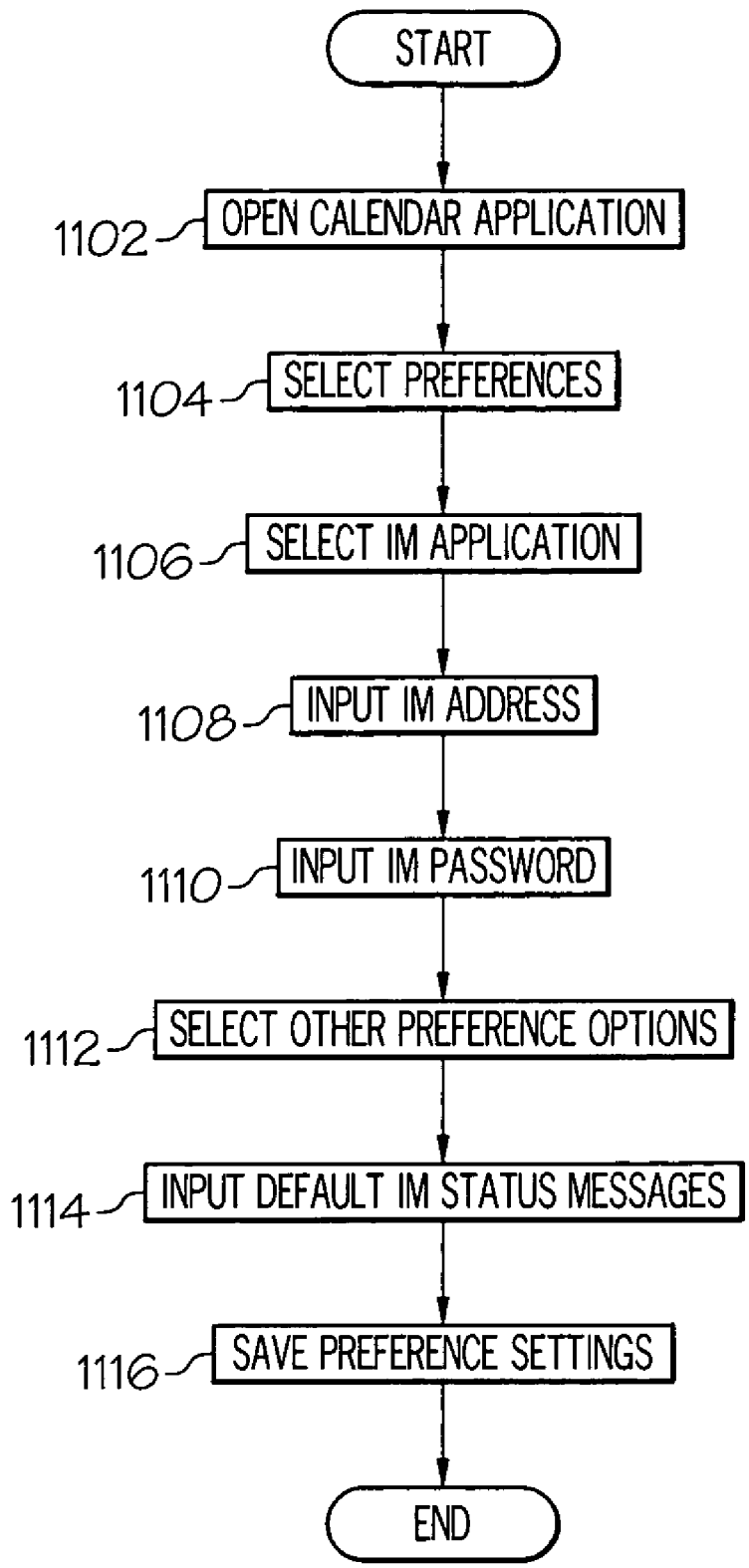
FIG. 11 is a flowchart illustrating an exemplary process for setting calendar preferences for linking a calendar application to an instant messaging application in accordance with an embodiment of the present invention.

With reference now to FIG. 11, a flowchart illustrating an exemplary process for setting calendar preferences for linking a calendar application to an instant messaging application is shown in accordance with an embodiment of the present invention. The process depicted in FIG. 11 may be implemented, for example, in a client device, such as instant messaging client 400 in FIG. 4.

The process begins when a user opens a calendar application, such as calendar application 404 in FIG. 4 (step 1102). The user then selects preferences, for example, in a menu bar, to access a calendar application preference window for the opened calendar application in step 1102, such as calendar application preference window 800 in FIG. 8 (step 1104).

Subsequent to accessing the calendar application preference window in step 1104, the user selects the instant messaging application that the user wishes to link to the calendar application from a drop-down menu, such as instant messaging type 806 in FIG. 8 (step 1106). Then the user inputs the address of the selected instant messaging application in step 1106 within an instant messaging address dialog box, such as instant messaging address 808 in FIG. 8 (step 1108). Alternatively, the calendar application may automatically insert the address of the selected instant messaging application in step 1106 into the instant messaging address dialog box. The calendar application needs the address of the instant messaging application in order to link the calendar application to the instant messaging application. If the instant messaging application is password protected, the user inputs the instant messaging application password into an instant messaging password dialog box, such as instant messaging password 810 in FIG. 8 (step 1110).

The user may select other preference options contained within the calendar application preference window, such as, for example, auto link via meeting notice check box 812, auto link via appointment notice check box 814, do not disturb meeting check box 816, and do not disturb appointment check box 818 in FIG. 8, by placing a checkmark in the appropriate preference check box (step 1112). These other preference options further define the calendar application's control of the instant messaging application's instant messaging status for the user during scheduled calendar events while the two applications are linked.

Then the user inputs default instant messaging status messages, such as default meeting message 820 and default appointment message 822 in FIG. 8, in a default message dialog box (step 1114). The user saves the inputted preference settings within the calendar application preference window by, for example, mouse clicking on a save button, such as OK button 824 in FIG. 8, thus, enabling the calendar application to link to the instant messaging application (step 1116). The process terminates thereafter.

Figure 12:
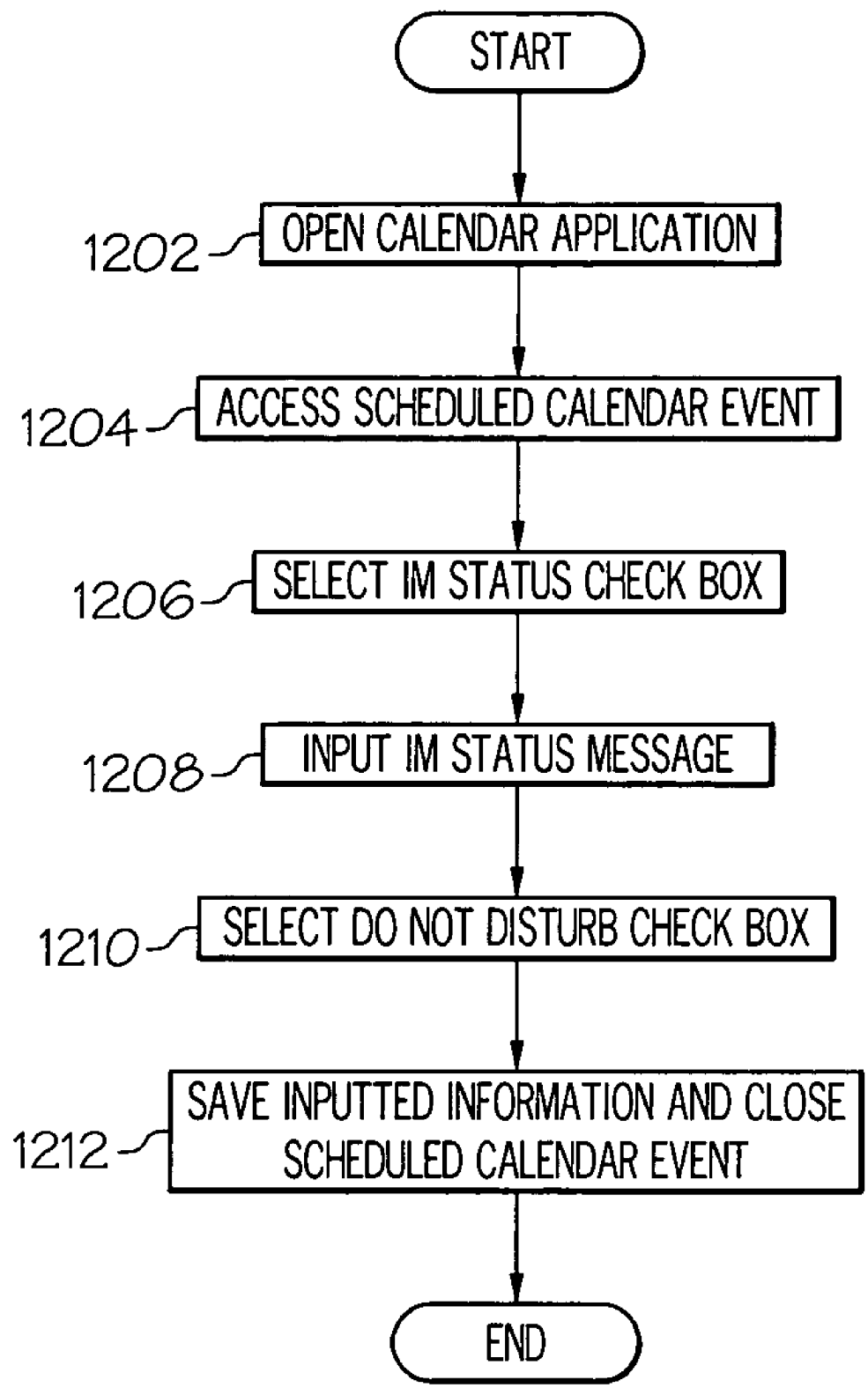
FIG. 12 is a flowchart illustrating an exemplary process for setting instant messaging status within a calendar application scheduled event in accordance with an embodiment of the present invention.

Referring now to FIG. 12, a flowchart illustrating an exemplary process for setting instant messaging status within a calendar application scheduled event is shown in accordance with an embodiment of the present invention. The process depicted in FIG. 12 may be implemented, for example, in a client device, such as instant messaging client 400 in FIG. 4.

The process begins when a user opens a calendar application, such as calendar application 404 in FIG. 4 (step 1202). The user then accesses a scheduled event on the calendar application, such as appointment event type 702 in FIG. 7 (step 1204). If the user desires for the calendar application to control the instant messaging status during this scheduled calendar event, then the user places a checkmark in the instant messaging status check box, such as instant messaging status check box 710 in FIG. 7 (step 1206). If the user does not want the calendar application to control the instant messaging status during this scheduled calendar event, then the user removes the checkmark in the instant messaging status check box. Thus, the user has the ability to change the instant messaging status for each individual scheduled calendar event within the scheduled calendar event's display window. The instant messaging status default setting may be determined, for example, by the calendar application preference settings, such as auto link via meeting notice check box 812 and auto link via appointment notice check box 814 in FIG. 8, set on a calendar application preference window.

Subsequent to placing a checkmark in the instant messaging status check box in step 1206, the user inputs an instant messaging status message in an instant messaging status dialog box, such as instant messaging dialog box 712 in FIG. 7 (step 1208). The instant messaging status default message may be determined, for example, by the calendar application preference settings, such as default meeting message 820 and default appointment message 822 in FIG. 8, set on a calendar application preference window.

If the user desires not to be disturbed by instant messages during the scheduled calendar event, then the user places a checkmark in the do not disturb check box, such as do not disturb check box 714 in FIG. 7 (step 1210). If the user wants to continue to receive instant messages during the scheduled calendar event, then the user removes the checkmark in the do not disturb check box. Consequently, the user has the ability to change the instant messaging do not disturb status for each scheduled calendar event within the scheduled calendar event's display window. The instant messaging do not disturb status default setting may be determined, for example, by the calendar application preference settings, such do not disturb meeting check box 816 and do not disturb appointment check box 818 in FIG. 8, set on a calendar application preference window.

The user saves the inputted information within the scheduled calendar event display window by, for example, mouse clicking on a save button, such as save and close button 716 in FIG. 7, thus, saving the inputted information and closing the scheduled calendar event display window (step 1212). The process terminates thereafter.

Figure 13:
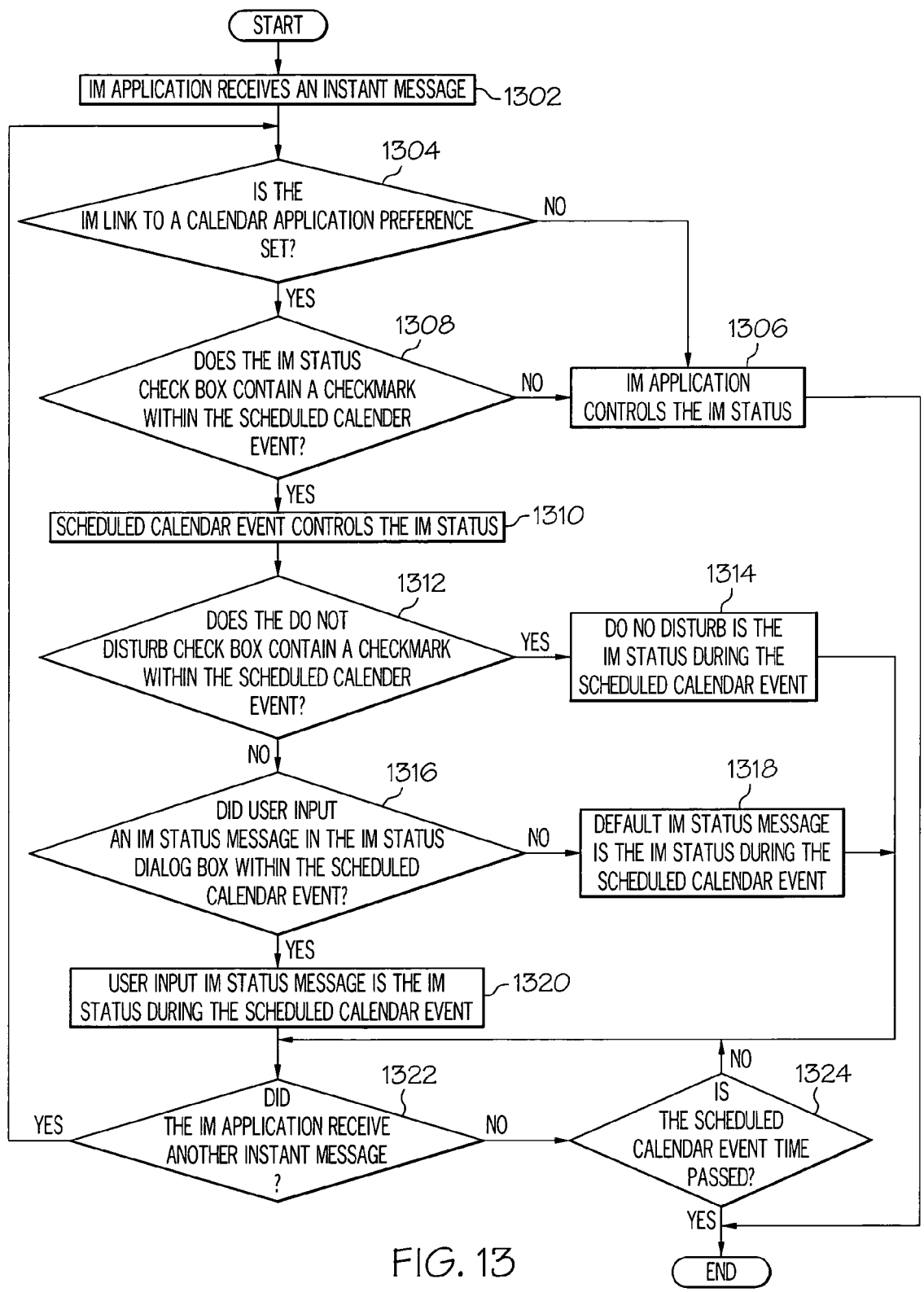
FIG. 13 is a flowchart illustrating an exemplary process for instant messaging status control within a client device in accordance with an embodiment of the present invention.

Turning now to FIG. 13, a flowchart illustrating an exemplary process for instant messaging status control within a client device is depicted in accordance with an embodiment of the present invention. The process depicted in FIG. 13 may be implemented, for example, in a client device, such as instant messaging client 400 in FIG. 4.

It should be noted that prior to beginning the process in step 1302 a user has opened an instant messaging application, such as instant messaging application 406 in FIG. 4, and a calendar application, such as calendar application 404 in FIG. 4, within the client device. In addition, as discussed above, the user has set the preference settings for linking the instant messaging application to the calendar application.

The process begins when the instant messaging application receives an instant message, such as, for example when instant messaging application 500 receives message 502 in FIG. 5 (step 1302). The instant messaging application then makes a determination as to whether an instant messaging link to a calendar application preference, such as instant messaging link to calendar application check box 904 in FIG. 9, is set (step 1304). If the instant messaging link to a calendar application preference is not set, no output of step 1304, then the instant messaging application retains control of the instant messaging status (step 1306) and the process terminates thereafter. If the instant messaging link to a calendar application preference is set, yes output of step 1304, then a determination is made as to whether an instant messaging status check box, such as instant messaging status check box 710 in FIG. 7, contains a checkmark within the scheduled calendar event (step 1308). If the instant messaging status check box does not contain a checkmark within the scheduled calendar event, no output of step 1308, then the process returns to step 1306 where the instant messaging application retains control of the instant messaging status. If the instant messaging status check box contains a checkmark within the scheduled calendar event, yes output of step 1308, then the instant messaging application passes control of the instant messaging status to the scheduled calendar event contained within the calendar application (step 1310).

Subsequent to the instant messaging application passing control of the instant messaging status to the scheduled calendar event contained within the calendar application in step 1310, a determination is made as to whether a do not disturb check box, such as do not disturb check box 714 in FIG. 7, contains a checkmark within the scheduled calendar event (step 1312). If the do not disturb check box contains a checkmark within the scheduled calendar event, yes output of step 1312, then do not disturb is the instant messaging status during the scheduled calendar event (step 1314). The process proceeds to step 1322 thereafter. If the do not disturb check box does not contain a checkmark within the scheduled calendar event, no output of step 1312, then a determination is made as to whether the user input an instant messaging status message in an instant messaging status dialog box within the scheduled calendar event, such as instant messaging status dialog box 712 in FIG. 7 (step 1316). If the user did not input an instant messaging status message in an instant messaging status dialog box within the scheduled calendar event, no output of step 1316, then a default instant messaging status message, such as default meeting message 820 or default appointment message 822 in FIG. 8, is the instant messaging status during the scheduled calendar event (step 1318). The process proceeds to step 1322 thereafter. If the user did input an instant messaging status message in the instant messaging status dialog box within the scheduled calendar event, yes output of step 1316, then the user input instant messaging status message is the instant messaging status during the scheduled calendar event (step 1320).

Afterward, a determination is made as to whether the instant messaging application received another instant message (step 1322). If the instant messaging application receives another instant message, yes output of step 1322, then the process returns to step 1304. If the instant messaging application did not receive another instant message, no output of step 1322, then a determination is made as to whether the scheduled calendar event time passed, such as event date and time 706 in FIG. 7 (step 1324). If the scheduled calendar event time has not passed, no output of step 1324, then the process returns to step 1322. If the scheduled calendar event time has passed, yes output of step 1324, then the process terminates thereafter.

Thus, embodiments of the present invention provide a computer implemented method, apparatus, and computer usable program code for managing instant messaging status. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing an instant messaging status, the computer implemented method comprising:
   responsive to a computer processor detecting an occurrence of a scheduled event for a user in calendar application, during the occurrence the detected scheduled event,
      dynamically linking the calendar application with a instant messaging application; and
      allowing the linked calendar application to control a status of the user instead of the linked instant messaging application, wherein the linked calendar application allows the user to control how many interruptions the user is willing to accept during the occurrence of the detected scheduled event.

2. The computer implemented method of claim 1, wherein allowing the linked calendar application to control a status of the user instead of the linked instant messaging application further comprises:
   changing the status of the user if the status is different from a preferred status specified for the event.

3. The computer implemented method of claim 2, wherein the instant messaging application and the calendar application reside in different devices.

4. The computer implemented method of claim 2, wherein the instant messaging application and the calendar application are linked together by set user preferences.

5. The computer implemented method of claim 2, wherein the instant messaging application and the calendar application are linked using an instant messaging application address and a calendar application address.

6. The computer implemented method of claim 1, allowing the linked instant messaging application to control a status of the user instead of the linked calendar application.

7. The computer implemented method of claim 6, wherein the instant messaging application and the calendar application reside in a same client device.

8. The computer implemented method of claim 1, wherein the occurrence of the event is at least one of a meeting or an appointment.

9. The computer implemented method of claim 1, wherein the status is at least one of a do not disturb or a user input message.

10. The computer implemented method of claim 9, wherein the user input message includes a default message.

11. A data processing system comprising:
    a bus system;
    a storage device connected to the bus system, wherein the storage device includes a set of instructions; and
    a processing unit connected to the bus system, wherein the processing unit executes the set of instructions responsive to detecting an occurrence of a scheduled event for a user in calendar application, during the occurrence the detected scheduled event, dynamically linking the calendar application with a instant messaging application; and allowing the linked calendar application to control a status of the user instead of the linked instant messaging application, wherein the linked calendar application allows the user to control how many interruptions the user is willing to accept during the occurrence of the detected scheduled event.

12. The data processing system of claim 11, allowing the linked instant messaging application to control a status of the user instead of the linked calendar application.

13. A
    computer-usable storage medium having computer usable program code tangibly embodied therein for managing an instant messaging status, the computer usable program code comprising:
    computer usable program code configured to detect an occurrence of a scheduled event for a user in calendar application, during the occurrence the detected scheduled event, dynamically link the calendar application with a instant messaging application and allow the linked calendar application to control a status of the user instead of the linked instant messaging application, wherein the linked calendar application allows the user to control how many interruptions the user is willing to accept during the occurrence of the detected scheduled event.

14. The computer-usable storage medium of claim 13, wherein the computer usable program code configured to allow the linked calendar application to control the status of the user instead of the linked instant messaging application further comprises:

changing the status of the user if the status is different from a preferred status specified for the event.

15. The computer-usable storage medium of claim 14, wherein the instant messaging application and the calendar application reside in different devices.

16. The computer-usable storage medium of claim 14, wherein the instant messaging application and the calendar application are linked together by set user preferences.

17. The computer-usable storage medium of claim 14, wherein the instant messaging application and the calendar application are linked using an instant messaging application address and a calendar application address.

18. The computer-usable storage medium of claim 13, the computer usable program code configured to allow the linked instant messaging application to control a status of the user instead of the linked calendar application.

19. The computer-usable storage medium of claim 18, wherein the instant messaging application and the calendar application reside in a same client device.

20. The computer-usable storage medium of claim 13, wherein the status is at least one of a do not disturb or a user input message.

\* \* \* \* \*

UNITED STATES PATENT AND TRADEMARK OFFICE
CERTIFICATE OF CORRECTION

PATENT NO.       : 7,584,258 B2                                    Page 1 of 1
APPLICATION NO.  : 11/294288
DATED            : September 1, 2009
INVENTOR(S)      : Mark Edmund Maresh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Fourteenth Day of September, 2010

David J. Kappos
*Director of the United States Patent and Trademark Office*